Nov. 6, 1951     D. W. RHOADES     2,573,873
HOG OILER

Filed May 20, 1948     2 SHEETS—SHEET 1

Don W. Rhoades
INVENTOR.

BY *Clarence A. O'Brien
and Harvey B. Jacobson*
Attorneys

Nov. 6, 1951  D. W. RHOADES  2,573,873
HOG OILER
Filed May 20, 1948  2 SHEETS—SHEET 2

Don W. Rhoades
INVENTOR.

Patented Nov. 6, 1951

2,573,873

UNITED STATES PATENT OFFICE 2,573,873

HOG OILER

Don W. Rhoades, Pender, Nebr., assignor to Automatic Equipment Manufacturing Company, Pender, Nebr., a corporation of Nebraska Application May 20, 1948, Serial No. 28,089

1 Claim. (Cl. 119—157)

This invention relates to novel and useful improvements in livestock treating apparatus.

An object of the invention is to supply a support with a movable frame pivoted thereto, which actuates a valve when an animal rubs or scratches thereagainst, to provide an absorbent pad to apply liquid in a sponge-like manner when the animal rubs thereon, to provide a metal covering well perforated to resist wear on the pad while permitting application of the liquid, to provide a hinged frame member in such a manner as to allow actuation by large and small animals alike and in the frame member supply a conductor for directing fluid from a dispenser to the pads for liquefying the same.

Another object is to supply a receptacle for receiving and applying overflow to avoid waste and to provide means for applying the composition or liquid to the underside of an animal.

Ancillary objects such as simplicity of structure will become apparent to those skilled in the art, in following the description of the preferred form of the invention, illustrated in the accompanying drawings, wherein.

Figure 1:
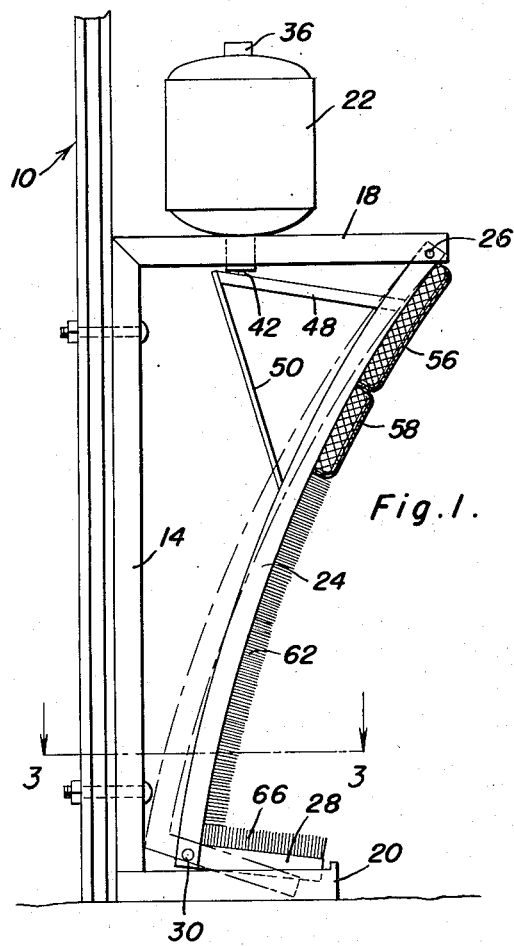
Figure 1 is an elevational side view of the preferred form of the invention.
Figure 2:
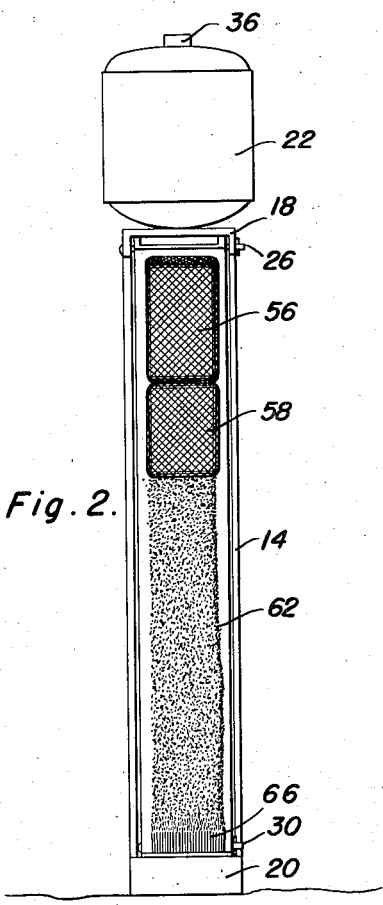
Figure 2 is a front view of the invention shown in Figure 1.
Figure 3:
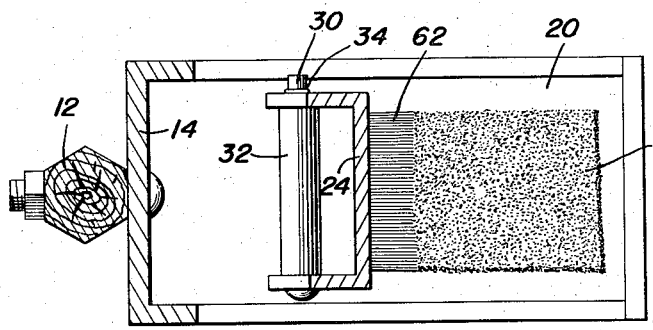
Figure 3 is an enlarged sectional view taken on the line 3—3 of Figure 1 and in the direction of the arrows.

This invention has been supplied in order to treat livestock by a simplified means. The structure for performing this function may be seen as inclusive of a support generally indicated at 10 which includes an upstanding post 12 having a channel 14 attached thereto through the medium of conventional screws or the like. The said upstanding channel has a substantially right angular extension of similar material 18 rigidly attached thereto, thereby forming a substantially L-shaped member.

A receptacle or basin 20 is attached to a lower portion of the said channel 14 to serve the purpose of a trap to permit the reception of used and unused composition which issues from the tank or receptacle 22, forming a portion of a dispenser.

An arcuate frame 24 is pivoted by means of a conventional pin 26 to the extension 18 and is applied at the forward end thereof. The lower portion of the arcuate frame 24 is supplied with an extension 28 which is pivoted thereto by means of a conventional pin 30. This pin may be received in the flanges of the substantially U-shaped frame arcuate member 24 and may have a sleeve 32 thereon to serve the purpose of a spacing member, between the said legs of the substantially channel-shaped member 24. Further, any suitable means such as a nut, washer 34, cotter pin or the like, may be used to maintain the pin 30 in position.

The said receptacle 22 has a closure 36 at the top portion thereof for filling and refilling purposes. The lower portion of the receptacle 22 terminates in a threaded neck 38 which is received in a threaded socket (unnumbered) of the extension 18.

A valve structure generally indicated at 40 is supplied in the said neck 38 and includes a piston 42 reciprocatively received in the neck closure with a spring 44 or other suitable resilient biasing means constantly urging the piston or plunger 42 in the closed position. Of course, a plurality of ports 46 are supplied in the neck closure for cooperation with the head of the piston 42 thereby permitting a composition such as a deodorant, insecticide, disinfectant or the like to be dispensed. The said spring 44 may seat on the closure of the neck and on a suitable pin (unnumbered) supplied on the piston 42.

Figure 4:
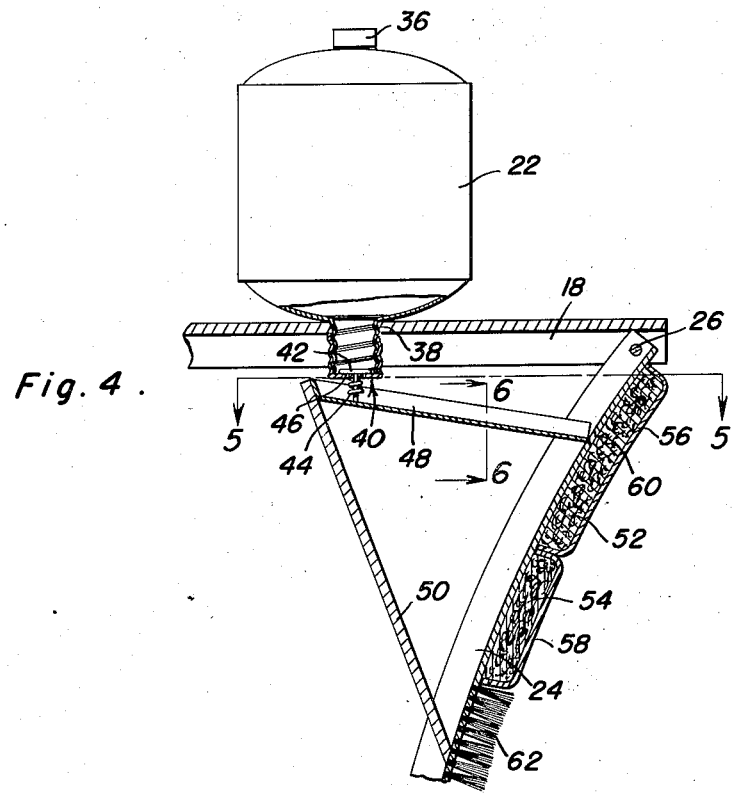
Figure 4 is an enlarged sectional detail of construction showing the valve mechanism and conductor utilized in association with and forming a part of the invention.
Figure 5:
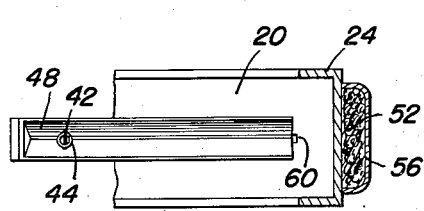
Figure 5 is a sectional view taken substantially on a line 5—5 of Figure 4 and in the direction of the arrows; and, Figure 6 is a sectional view taken substantially on the line 6—6 of Figure 4 and in the direction of the arrows.
Figure 6:
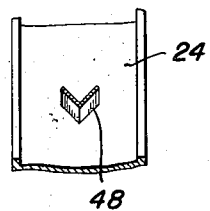

Means for actuating the valve at a predetermined and under a predetermined condition is supplied. The preferable valve actuation means may be seen best in Figure 4 as a conduit or trough 48 which is attached to the arcuate frame member 24 by conventional means such as welding, brazing or the like. This trough serves the purpose of a cam which is operatively engaged with the valve stem. Upon pivotal movement of the frame 24 it is seen that the valve piston or plunger 42 is actuated against the inherent force of the spring thereby permitting a charge of fluid or composition to issue from the receptacle 22. A support member 50 may be attached to the arcuate frame 24 and to one terminal of the said trough or conduit 48 for stiffening or strengthening purposes.

Means for receiving the composition after it has been dispensed from the dispensing mechanism is provided on the frame 24. This means may be seen best in Figure 4 as a pair of juxtaposed pads 52 and 54 respectively which are supplied on the arcuate front surface of said frame. These pads are covered by well perforated metallic covers 56 and 58 respectively and a port or passage 60 is supplied in the arcuate frame 24, communicating with the conductor 48. It is now apparent that the composition flowing through the conductor 48 is received in the pads 52 and 54 successively through the well perforated metallic closures thereover.

A relatively long brush element 62 or other suitable abrading means is attached to the said frame 24 and is in juxtaposition to the pads 52 and 54. This brush element receives the fluid or other composition from the pads 52 and 54 for liquefying or otherwise treating livestock when they rub against the frame.

The said extension 28 also has a brush element 66 attached thereto for a similar reason. This brush element is adapted to engage the undersurface or lower portion of an animal thereby treating this portion of its anatomy.

Upon application of a force to the frame member 24, it is readily apparent that the frame will be pivoted thereby actuating the valve plunger or piston 42 in order to dispense a quantity of composition from the receptacle 22. This quantity or charge is received in the conductor 48, flows theredown and is absorbed by the pads 52 and 54 respectively. Since these pads are covered by means of a well perforated or foraminous covering, the liquid or other composition flows to the brush elements 62 and 66. Thus, the animal engaging the frame 24 is both abraded and treated by means of the composition within the abrading means.

The overflow is received in the receptacle 20 and tends to saturate the lower brush element 66 thereby constantly maintaining this brush in such a condition as to effectively treat the undersurface or lower surface of an animal. Further, the liquid in the receptacle 22 may be recouped and re-used if such is considered economical.

It is apparent that certain variations may be made without departing from the spirit of the invention. Accordingly, limitation is sought only in accordance with the scope of the following claim.

Having described the invention what is claimed as new is:

In a livestock treating apparatus which includes a support with means for maintaining a supply of livestock treating composition carried thereby, together with a valve for dispensing the composition, the improvement which comprises a smoothly curved frame pivoted to said support and having a trough fixed thereto and arranged to operate said valve, said trough being adapted to conduct the livestock treating composition to said frame, said frame having a passage therein in communication with said trough, and said frame having an upper end and a lower end, the upper end being adapted to hold at least one pad so that the composition passing through said passage may impregnate said pad, the lower end of said frame adapted to support an abrading means to receive by gravity flow the composition which passes through said passage, and means operatively associated with said frame for collecting the drainage from said frame.

DON W. RHOADES.

REFERENCES CITED

The following references are of record in the file of this patent:

UNITED STATES PATENTS

| Number | Name | Date |
|---|---|---|
| 1,080,037 | Wright et al. | Dec. 2, 1913 |
| 1,151,883 | Jones | Aug. 31, 1915 |
| 1,173,761 | Armstrong | Feb. 29, 1916 |
| 1,173,958 | Haines | Feb. 29, 1916 |
| 1,237,606 | Boldry | Aug. 21, 1917 |
| 1,276,972 | Schultz | Aug. 27, 1918 |
| 1,306,473 | Duckham | June 10, 1919 |
| 1,327,088 | Curttright | Jan. 6, 1920 |
| 1,568,226 | Larson | Jan. 5, 1926 |
| 1,627,516 | Larson | May 3, 1927 |
| 1,677,560 | Koerner | July 17, 1928 |
| 2,333,946 | McQuistan | Nov. 9, 1943 |
| 2,441,058 | Carwile | May 4, 1948 |

FOREIGN PATENTS

| Number | Country | Date |
|---|---|---|
| 407,144 | Great Britain | Mar. 15, 1934 |